US010165048B2

(12) United States Patent
Luo et al.

(10) Patent No.: US 10,165,048 B2
(45) Date of Patent: Dec. 25, 2018

(54) DATA COPY STORAGE METHOD, TERMINAL APPARATUS, AND SERVER APPARATUS

(71) Applicants: BEIJING JINGDONG SHANGKE INFORMATION TECHNOLOGY CO, LTD., Haidian District, Beijing (CN); BEIJING JINGDONG CENTURY TRADING CO., LTD., Beijing (CN)

(72) Inventors: Wenbin Luo, Beijing (CN); Bo Zhang, Beijing (CN); Wanyuan Yang, Beijing (CN); Xiaolong Yang, Beijing (CN)

(73) Assignees: BEIJING JINGDONG SHANGKE INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 218 days.

(21) Appl. No.: 15/039,342

(22) PCT Filed: Sep. 26, 2014

(86) PCT No.: PCT/CN2014/087621
§ 371 (c)(1),
(2) Date: May 25, 2016

(87) PCT Pub. No.: WO2015/081750
PCT Pub. Date: Jun. 11, 2015

(65) Prior Publication Data
US 2017/0048313 A1   Feb. 16, 2017

(30) Foreign Application Priority Data
Dec. 3, 2013   (CN) .......................... 2013 1 0641751

(51) Int. Cl.
*G06F 15/16*   (2006.01)
*H04L 29/08*   (2006.01)
*H04L 12/44*   (2006.01)

(52) U.S. Cl.
CPC ...... *H04L 67/1095* (2013.01); *H04L 67/1097* (2013.01); *H04L 12/44* (2013.01)

(58) Field of Classification Search
CPC .. H04L 12/44; H04L 67/1095; H04L 67/1097
(Continued)

(56) References Cited

U.S. PATENT DOCUMENTS 7,647,329 B1 *   1/2010   Fischman .......... G06F 17/30094
                                                                        707/999.1
9,418,131 B1 *   8/2016   Halevi .............. G06F 17/30575
(Continued)

FOREIGN PATENT DOCUMENTS

| CN | 102571991 A | 7/2012 |
| CN | 102916811 A | 2/2013 |
| CN | 103634401 A | 3/2014 |

OTHER PUBLICATIONS

International Search Report for Application No. PCT/CN2014/087621 dated Dec. 30, 2014 (11 pages).

*Primary Examiner* — Wing F Chan
*Assistant Examiner* — Andrew Woo
(74) *Attorney, Agent, or Firm* — Michael Best & Friedrich LLP

(57) ABSTRACT

Provided are a data replica storage method, a terminal apparatus, and a server apparatus, which help to improve the reliability of a distributed data storage system without a central node and reduce an amount of migrated data when the number of nodes of the system changes. The method comprises: for each data replica to be stored, selecting child nodes level by level from a pre-selected intermediate node until a leaf node according to a tree-structured a distributed
(Continued)

data storage system without a central node, and determining the leaf node as a target storage position of the data replica, selection of a child node comprising: combining an identification of data to be stored and an identification of a child node into a host image, obtaining a mapping value related to the child node using a preset mapping mode, selecting a sub-node of a central node according to the mapping value, and resetting a mapping relationship before each time when the child node is selected; and storing all data replicas to be stored at the target storage positions of the data replicas.

14 Claims, 3 Drawing Sheets

(58) Field of Classification Search
USPC .......................................................... 709/217
See application file for complete search history.

(56) References Cited

U.S. PATENT DOCUMENTS

| 2008/0144471 | A1* | 6/2008 | Garapati | ................... G06F 8/63 |
| | | | | 369/99 |
| 2010/0146128 | A1 | 6/2010 | Kulkarni et al. | |

* cited by examiner

DATA COPY STORAGE METHOD, TERMINAL APPARATUS, AND SERVER APPARATUS

TECHNICAL FIELD

The present invention relates to the technical field of computer and particularly to a method, a terminal apparatus, and a server apparatus for storing data replicas.

BACKGROUND ART

A distributed data storage system generally utilizes multi-replica mode for storing data so as to improve the reliability of data storage. The physical topology of a storage device is generally hierarchical, referring to FIG. 1 which is a diagram of the physical topology of a storage device in a distributed data storage system relating to the present invention. As shown in FIG. 1, the distributed data storage system is provided in a data center 10 which consists of three machine rooms M1, M2, and M3, there are several racks provided in each of the three machine rooms M1, M2, and M3, for example, in machine room 2 (M2) racks 1, 2, . . . , and N1 (R1, R2, . . . RN1) are deployed. Further, on each of the racks, a plurality of hosts (computers) are provided, for example, hosts 1, 2, . . . , and N3 (H1, H2, . . . HN2) are provided on rack 1 (R1). In each host, a plurality of storage medium devices (generally hard disks) are provided, for example, hard disks 1, 2, . . . , and N3 (HD1, HD2, . . . HDN3) are provided in host 2 (H2). For clarity, FIG. 1 only shows a part of devices. It can be seen that the distributed data storage system has a tree structure, and the storage medium devices are positioned on leaf nodes, and the hosts, racks and machine rooms are intermediate nodes.

Distributed data storage systems can be divided into two modes, one with center nodes and the other without center nodes. Generally, in the distributed data storage system with a center node, a client, the center node and a storage node are included, data are processed into blocks and stored in multiple replicas. For positions for storing the data replicas, positions of distributing the data replicas are decided by the center node according to the load conditions of the storage node and the storage strategy of the replicas. The center node can either be host-backup configuration of two servers or be a cluster of servers. In a distributed data storage system without a center node, each of the nodes is connected with each other, data are distributed randomly on storage devices of the nodes, and the positions of storage can be obtained by a node using the hash function.

For the distributed data storage system with a center node, when data are read therefrom, it first needs to access the center node in order to acquire the positions of storing the data, which makes the center node overloaded and the processing efficiency reduced, thereby forming the bottleneck of the whole system and reducing the system performance. Furthermore, in a case that there is a failure in the center node, the bottleneck will be aggravated, and even the whole distributed data storage system becomes unavailable and has relatively low reliability.

The distributed data storage system without a center node can avoid the aforesaid bottleneck, but the reliability thereof is still insufficient. For example, if there is a power failure or network failure in some rack and all replicas of some data are in hard disks of hosts of the rack, the data cannot be acquired. Besides, when the number of devices changes, for example, adding one hard disk or one host, a wide range of data migration will inevitably occur in the distributed data storage system without a center node. This is illustrated by the following simple example.

For example, the distributed data storage system without a center node has 5 nodes (far more than 5 actually), the hash value of one data to be stored that is calculated by the hash function is 13, taking modulo by the number of the nodes, it is 3, and then the data to be stored is saved in node 3; when the devices are increased to make the number of the nodes be 6 and the data is read, taking modulo by node number 6 of hash value 13, it is 2, i.e., reading data from node 2. Now, the data will migrate from node 3 to node 2 firstly. When the number of nodes changes, the results of modulo will be certainly different, so that data migration will inevitably occur when data stored before the change of the number of nodes are read after the change thereof. Consequently, once the number of nodes changes, data migration is common; this will cause the efficiency of the system and the lifetime of the storage medium reduced.

SUMMARY OF THE INVENTION

Accordingly, the present invention provides a method, a terminal apparatus, and a server apparatus for storing data replicas, which contribute to improve the reliability of a distributed data storage system without a central node and reduce the amount of migrated data when the number of nodes of the system changes.

To realize the aforesaid object, according to one aspect of the present invention, a method for storing data replicas is provided.

According to the present invention, A method for storing data replicas, applied in a distributed data storage system with a tree structure and without a center node, wherein the tree structure comprises leaf nodes, on which storage medium devices are located, and intermediate nodes; and characterized in that the method comprises: Step A: for each data replica of data to be stored, selecting a child node, wherein the child node is selected level by level from a pre-selected intermediate node of the tree structure according to the tree structure in a preset child node selecting mode until the child node that is selected is a leaf node, and then determining the leaf node as a target storage position of the data replica; wherein the child node selecting mode is: obtaining a mapping value related to each child node of an intermediate node according to a preset mapping mode by taking each combination of an identification of the data to be stored and an identification of said each child node as a preliminary image, and selecting one child node of said intermediate node according to a comparison of the obtained plurality of mapping values; and wherein for each intermediate node, mapping mode is reset before each time of selecting the child nodes thereof; Step B: after determining target storage positions of all data replicas of the data to be stored, saving all the data replicas of the data to be stored in target storage positions of the data replicas, respectively.

Optionally, for one or more specified intermediate nodes, if the intermediate node is selected again during the determination of target storage positions of all data replicas of the data to be stored, re-selecting from all sibling nodes of the intermediate node.

Optionally, during the determination of target storage positions of all data replicas of the data to be stored, if the target storage position determined for a current data replica is the same as that for another data replica, re-determining the target storage position of the current data replica according to Step A such that the target storage positions of all data replicas of the data to be stored are different.

Optionally, the mapping mode comprises calculating a unique mapping value using Hash algorithm after the preliminary image is adjusted.

Optionally, the mapping mode comprises calculating a hash value using Hash algorithm after the preliminary image is adjusted; obtaining the mapping value by multiplying the hash value by a preset weighted value; wherein the preset weighted value is the sum of weighted values of all leaf nodes communicated with a child node in the preliminary image, and the weighted values of the leaf nodes are in positive correlation with storage capacity of a storage medium device on the leaf nodes.

Optionally, the step of resetting the mapping relationship comprises changing a parameter adopted during an adjustment of the preliminary image.

According to another aspect of the present invention, a terminal apparatus is provided.

The terminal apparatus in the present invention is used for saving a plurality of data replicas of data to be stored into a distributed data storage system with a tree structure and without a center node, wherein the tree structure comprises leaf nodes, on which storage medium devices are located, and intermediate nodes. The terminal apparatus comprises a selection module for, for each data replica of data to be stored, selecting a child node, wherein the child node is selected level by level from a pre-selected intermediate node of the tree structure according to the tree structure in a preset child node selecting mode until the child node that is selected is a leaf node, and then determining the leaf node as a target storage position of the data replica, wherein the child node selecting mode is: obtaining a mapping value related to each child node of an intermediate node according to a preset mapping mode by taking each combination of an identification of the data to be stored and an identification of said each child node as a preliminary image, and selecting one child node of said intermediate node according to a comparison of the obtained plurality of mapping values; and wherein for each intermediate node, mapping mode is reset before each time of selecting the child nodes thereof; an upload module for, after the selection module determines target storage positions of all data replicas of the data to be stored, transmitting all the data replicas of the data to be stored and information of the target storage positions of all the data replicas of the data to be stored to a computer in the distributed data storage system, such that the computer saves all the data replicas of the data to be stored into the target storage positions thereof, respectively.

Optionally, the selection module is further used for, regarding one or more specified intermediate nodes, if the intermediate node is selected again during the determination of target storage positions of all data replicas of the data to be stored, re-selecting from all sibling nodes of the intermediate node.

Optionally, the selection module is further used for, during the determination of target storage positions of all data replicas of the data to be stored, if the target storage position determined for a current data replica is the same as that for another data replica, re-determining the target storage position of the current data replica, such that the target storage positions of all data replicas of the data to be stored are different.

Optionally, the mapping mode comprises calculating a unique mapping value using Hash algorithm after the preliminary image is adjusted.

Optionally, the mapping mode comprises calculating a hash value using Hash algorithm after the preliminary image is adjusted; obtaining the mapping value by multiplying the hash value by a preset weighted value; wherein the preset weighted value is the sum of weighted values of all leaf nodes communicated with a child node in the preliminary image, and the weighted values of the leaf nodes are in positive correlation with storage capacity of a storage medium device on the leaf nodes.

According to another aspect of the present invention, a server apparatus is provided.

The server apparatus in the present invention is set within a server in a distributed data storage system with a tree structure and without a central node and is used for storing a plurality of data replicas of data to be stored in the distributed data storage system, wherein the tree structure comprises leaf nodes on which a storage medium device is located, and intermediate nodes. The server apparatus comprises a selection module for, each data replica of data to be stored, selecting a child node, wherein the child node is selected level by level from a pre-selected intermediate node of the tree structure according to the tree structure in a preset child node selecting mode until the child node that is selected is a leaf node, and then determining the leaf node as a target storage position of the data replica; wherein the child node selecting mode is: obtaining a mapping value related to each child node of an intermediate node according to a preset mapping mode by taking each combination of an identification of the data to be stored and an identification of said each child node as a preliminary image, and selecting one child node of said intermediate node according to a comparison of the obtained plurality of mapping values; and wherein for each intermediate node, mapping mode is reset before each time of selecting the child nodes thereof; a saving module for after determining target storage positions of all data replicas of the data to be stored, saving all the data replicas of the data to be stored in target storage positions of the data replicas, respectively.

Optionally, the selection module is further used for, regarding one or more specified intermediate nodes, if the intermediate node is selected again during the determination of target storage positions of all data replicas of the data to be stored, re-selecting from all sibling nodes of the intermediate node.

Optionally, the selection module is further used for, during the determination of target storage positions of all data replicas of the data to be stored, if the target storage position determined for a current data replica is the same as that for another data replica, re-determining the target storage position of the current data replica according, such that the target storage positions of all data replicas of the data to be stored are different.

Optionally, the mapping mode comprises calculating a unique mapping value using Hash algorithm after the preliminary image is adjusted.

Optionally, the mapping mode comprises calculating a hash value using Hash algorithm after the preliminary image is adjusted; obtaining the mapping value by multiplying the hash value by a preset weighted value; wherein the preset weighted value is the sum of weighted values of all leaf nodes communicated with a child node in the preliminary image, and the weighted values of the leaf nodes are in positive correlation with storage capacity of a storage medium device on the leaf nodes.

Optionally, the server apparatus further comprises an acknowledgement module for triggering the selection module in a server where one pre-selected replica of respective data currently saved in the distributed data storage system is located when a node in the distributed data storage system changes. The selection module is further used for, when it is triggered by the acknowledgement module, taking the pre-selected replica and other replicas identical with the replica as the data to be stored, determining a new target storage position of each data replica of the data to be stored, and then migrating those of the data replicas, of which original storage positions are not the new target storage positions, into the new target storage positions.

According to the technical solution of the present invention, when target storage positions of replicas are determined, regarding each data replica of data to be stored, it selects, from a pre-selected intermediate node in a tree structure of a distributed data storage system, child nodes level by level in a preset child node selection mode until a child node selected is a leaf node, and then determines the leaf node as a target storage position of the data replica. That is to say, it selects, from the selected intermediate node, child nodes level by level until a leaf node where a storage medium device is located, and for each intermediate node, the mode of selecting the child nodes thereof changes every time such that the selection results change as far as possible. Under the circumstance of selecting the child nodes level by level, such change renders that the target storage positions of a plurality of replicas disperse as much as possible, which helps to improve the robustness of the distributed data storage system when the device breaks down and thus improves the reliability of the distributed data storage system. In addition, it may specify one or more intermediate nodes and make one data to be stored only have one replica in the storage device of the intermediate node. That is, the data replicas are distributed in different intermediate nodes such as racks or hosts; in this way, when one intermediate node becomes ineffective, for example, the rack or host is out of service, there are still other replicas that can provide service. This reduces data loss and the risk and probability of unattainable property and improves the reliability of the distributed data storage system. Under the circumstance of newly increasing the storage devices of the distributed data storage system, a good many of data replicas are unnecessary to migrate, the amount of migrated data is quite small, the effect to the efficiency of the system is relatively small, and therefore, the capacity of the distributed data storage system can be expanded easily.

BRIEF DESCRIPTION OF THE DRAWINGS

Figures are provided for better understanding of the present invention, and are not intended to be limiting, wherein.

DESCRIPTION OF THE EMBODIMENTS

The detailed description is set forth below in connection with the appended drawings wherein various details of embodiments of the present invention are included in order to contribute to the understanding of the invention, but merely can be considered as exemplary aspects. Hence, persons skilled in the art should realize that various changes and modifications to the embodiments described herein can be made without departing from the spirit or scope of the invention. Similarly, for the sake of clarification and simplicity of description, explanations on the commonly known functions and structures are omitted in the following descriptions.

Figure 1:
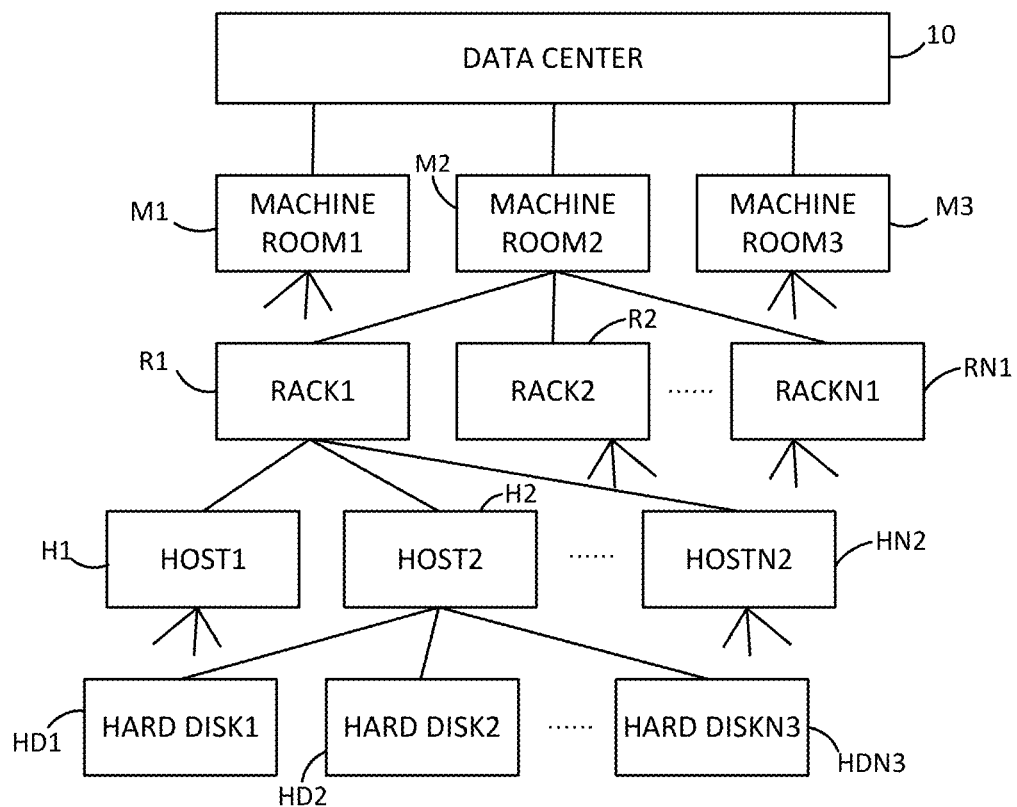
FIG. 1 is a diagram of the physical topology of a storage device of a distributed data storage system involved in the present invention.
Figure 2:
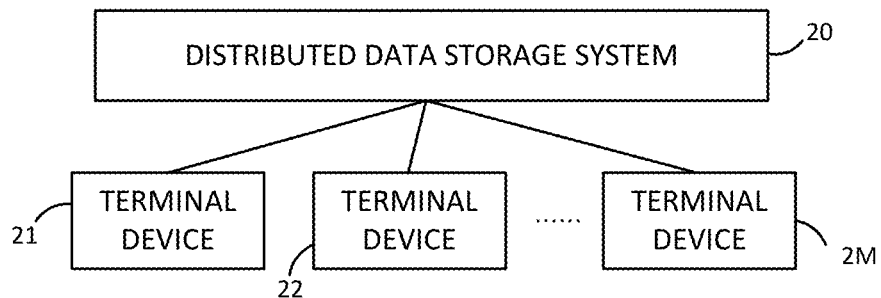
FIG. 2 is a diagram of the state of the connection between terminal devices and the distributed data storage system according to the embodiments of the present invention.

FIG. 2 is a diagram of the state of the connection between terminal devices and the distributed data storage system according to the embodiments of the present invention. As shown in FIG. 2, a plurality of terminal devices 21, 22, . . . , 2M are connected with a distributed data storage system 20. In this embodiment, the physical topology of the distributed data storage system 20 also adopts the tree structure as shown in FIG. 1. Each terminal device saves information of the physical topology, and thus can calculate the target storage position of each data replica to be stored in the distributed data storage system 20.

Figure 3:
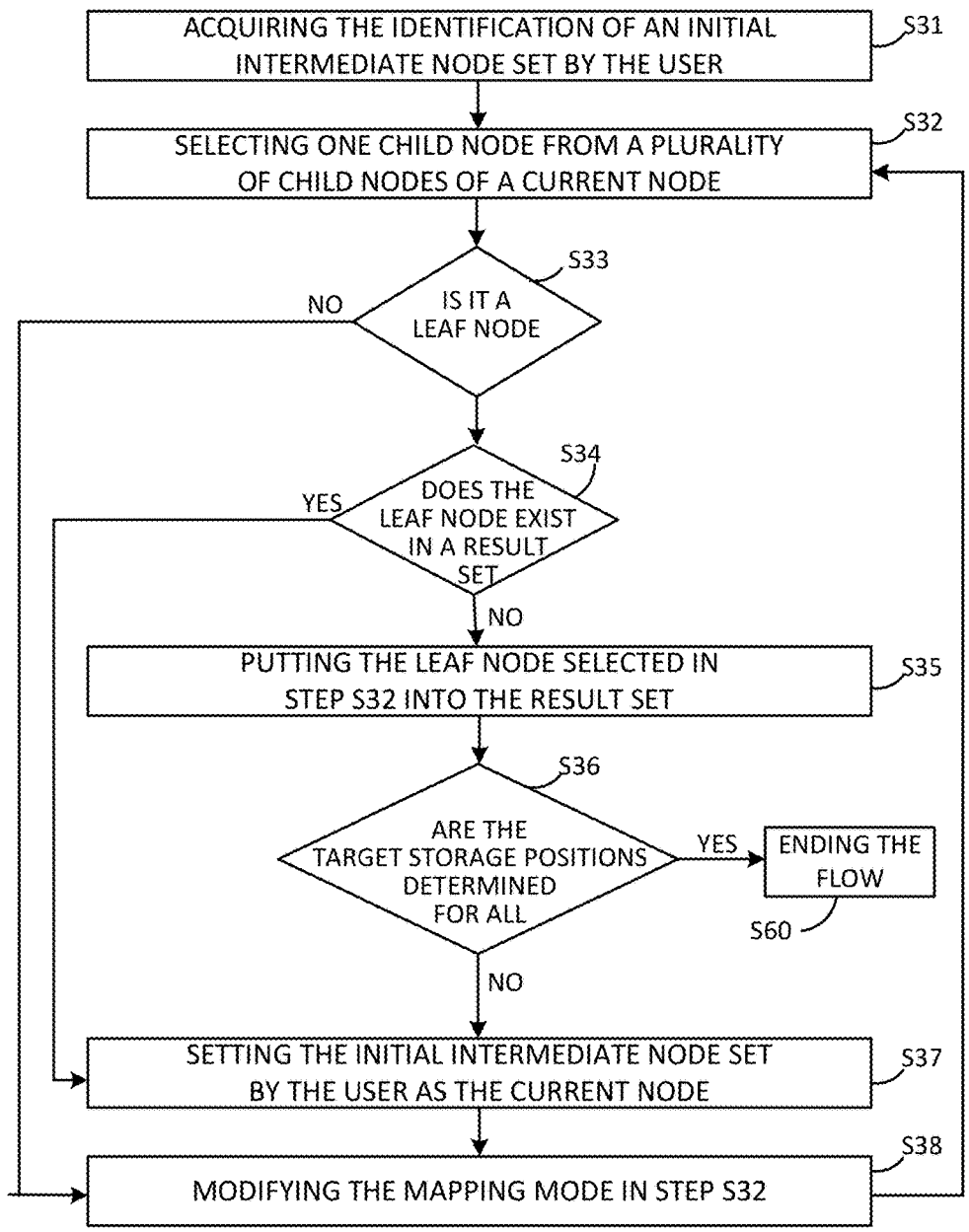
FIG. 3 is a diagram of a method for storing data replicas according to the embodiments of the present invention.

For a plurality of data replicas of data to be stored in the system 20, the terminal devices sequentially calculate the target storage position of each of the data replicas to be stored in the system 20, that is, one leaf node in the system 20 is determined for each data replica, and the data replica is saved in a storage medium device located in the leaf node. When the leaf node is determined, it selects, from an intermediate node in the system 20 that is specified by a user, child nodes level by level until the selected child node is a leaf node. The flow of determining the target storage position of one data replica is as shown in FIG. 3 which is a diagram of a method for storing data replica according to the embodiments of the present invention.

Step S31: acquiring the identification of an initial intermediate node set by the user. From this step, by a circulating flow, the target storage position of each replica of a data to be stored is determined to get a result set. The result set is a set of the target storage positions of all the replicas of the data to be stored. Referring to FIG. 1, the following steps are illustrated by taking machine room 2, which serves as the initial intermediate node, as an example.

Step S32: selecting one of a plurality of child nodes of a current node. When this step is executed for the first time, the current node is the initial intermediate node set by the user. When child nodes are selected, the score of each child node is obtained, the preferable mode is obtaining a mapping value using the mapping mode in the strategy based on an identification, for example, the filename of the data, of the data to be stored and an identification of the child node, and the mapping value is the score of the child node to the present data to be stored. In the aforesaid mapping mode, it may calculate by adopting the Hash algorithm particularly. Since the mapping mode will change in the following Step S36, in this step, the combination of the identification of the data to be stored, the identification of the child node and an adjustable parameter is calculated using the Hash function to obtain a hash value, and the hash value is taken as the aforesaid score. After the score of each child node of the initial intermediate node is obtained, one child node is selected based on each score, for example, selecting the child node with the highest score.

The other mapping mode, i.e., the mode of calculating the aforesaid score, is, in the consideration of trying to save the data in a storage medium device with larger capacity, giving a weight to each leaf node. The weight is in positive correlation with the storage capacity of the storage medium device on the leaf node, for example, the weight of a 1 TB hard disk is 1 and that of a 3 TB hard disk is 3. The weight of the intermediate node is the sum of the weights of all the child nodes thereof. The score of the node is multiplying the weight of the node by the aforesaid hash value. In this way, when a child node of an intermediate node is selected according to the highest score, the node with larger storage capacity will be selected more possibly.

Step S33: determining whether the node selected in Step S32 is a leaf node. If Yes, the flow enters Step S34; if No, the flow enters Step S38. It returns Step S32 after Step S38, and then a current node in Step S32 is the node determined in Step S33.

Step S34: determining whether the leaf node selected in Step S32 is present in the result set. To improve the reliability, it should make a plurality of replicas of a data to be stored distributed in different storage medium devices. Thus, if the determination result of this step is Yes, the current selection of the leaf node is abandoned, the flow enters Step S37, and the target storage position of the current replica is re-determined in Step S32 to be executed one again; otherwise, the current selection of the leaf node is kept, and the flow enters Step S35.

Step S35: putting the leaf node selected in Step S32 into the result set. The flow enters Step S36 after Step S35.

Step S36: determining whether the target storage positions of all the replicas of the current data to be stored have been determined. If Yes, the flow ends at Step S60; if No, the flow enters Step S37.

Step S37: setting the initial intermediate node set by the user as the current node. Then, the flow enters Step S38.

Step S38: modifying the mapping mode in Step S32, that is, changing the adjustable parameter in Step S32. The object is to change the score of the node and then change the selection result of the node in Step S32. The modes of adjusting the adjustable parameter may be various, provided that they achieve the purpose of changing the final score. For example, it may take a generated random number as the parameter or accumulate a fixed or random value greater than zero to the parameter at each time of adjustment. Of course, the mapping mode in Step S32 may be modified by means of changing the Hash function. After this step, the flow returns Step S32.

It can be seen from the aforesaid flow that when target storage positions of replicas are determined, it selects, from a selected intermediate node, child nodes level by level until a leaf node where a storage medium device is located, and for each intermediate node, the mode of selecting child nodes thereof changes every time such that the selection results change as far as possible. Under the circumstance of selecting the child nodes level by level, such change renders that the target storage positions of a plurality of replicas disperse as far as possible, which helps to improve the robustness of the distributed data storage system when a device thereof breaks down and thus improves the reliability of the distributed data storage system.

Of course, as described above, the mode of selecting the child nodes of each intermediate node in the aforesaid flow changes every time such that the selection results change as far as possible. However, such change is not absolute; actually, there is a small probability that the results of two times of selections are the same. For example, replica 1 is determined in a hard disk of some host under rack 1, replica 2 is also determined in a hard disk of some host under rack 1, and accordingly, the two replicas will become unavailable because of a total failure (for example, power or network failure) of rack 1. Moreover, in an actual distributed data storage system, a more ideal mode is distributing all replicas in different storage positions of some hierarchy, for example, there are 10 racks in the system, and 8 replicas, it is best that the eight replicas are distributed on different racks. Or, due to some actual situations, the reliability of some racks are low, it is best not to make a plurality of replicas positioned in the storage devices on such racks. Therefore, in the present embodiment, one preferable mode is specifying one or more intermediate modes, and when the flow as shown in FIG. 3 is executed, adding one step between Step S32 and Step S33, and determining in the added step whether the child node selected in Step S32 has yet been selected or not. Here, there are two cases, one is that for one data replica, it finds that other data replicas are in the target storage position after the first time of determining the target storage position thereof (i.e., the case that the determination result is Yes in Step S34), and during the re-determination of the target storage position of the data replica, the child node selected is the same as that selected during the first time of determining the target storage position of the data replica. The probability of this case is relatively small because the flow needs to pass through Step S38 therebetween. The other case is that for different data replicas, the same child node is selected during the determination of the target storage positions thereof, for example, it determines that the target storage position of data replica 1 is hard disk 2 in host 2, and during the determination of the target storage position of data replica 2, it also selects host 2 in one time of execution of Step S32. At this time, it determines in the step added between Step S32 and Step S33 whether the intermediate node selected currently has yet been selected or not, if the result is "Yes", the flow enters Step S38 directly, and in Step S32 to be re-executed subsequently, a parent node of the intermediate node to be re-selected is taken as the current node, that is, re-selecting from brother nodes of the intermediate node to be re-selected. As illustrated in the above example, if it confirms that host 2 has yet been selected, it reselects another host in the rack where host 2 is located. By the aforesaid processing, it is possible to make one data to be stored only have one replica in a specified intermediate node such as a rack or a host, that is, data copes are distributed in different racks or hosts, such that when one rack or host cannot serve, there are still other replicas that can provide service. This reduces data loss and the risk and probability of unattainable property and improves the reliability of the distributed data storage system.

The terminal device executes the flow as shown in FIG. 3, capable of determining the target storage position of each of the data replicas of one data to be stored in the distributed data storage system. For the distributed data storage system, due to the continuous increase of the amount of data, new storage devices often need to be added into the system, for example, adding a hard disk, a host or a rack, that is, the node will change; moreover, some of the data in existing devices need to be migrated into the newly added storage devices. For this circumstance, in the present embodiment, the host in the distributed data storage system also has the function of determining the target storage positions of the data replicas as the aforesaid terminal device, thereby being capable of determining new storage positions of the data already stored in the system under the circumstance that new storage devices are added to the distributed data storage system. It needs to note that each of the hosts will carry out calculation to make the determination so long as new storage devices are added to the system. Of course, such calculation is only carried out when new storage devices are added to the system. It can be seen from the flow in FIG. 3 that such calculation is simple, and occupies few CPU resources, and thus the work of the host that re-determines the new storage positions of the data already stored will not affect the performance of the system greatly.

Besides, for one data already stored, the aforesaid calculation can only be executed by one thread of one host, the host is the one saving one replica of the data already stored and can be set when the terminal device determines the target storage position of each of the data replicas of the data already stored. For example, the terminal device determines target storage positions of first to eighth replicas of data A to be stored in turn, wherein the first replica will be saved in one hard disk of a fourth host of a second rack, then the data is sent to the host where each of the target storage position is located, when new storage devices are added to the distributed data storage system, the host saving the first replica (i.e., the first replica of which the target storage position is determined by the terminal device) of data A, i.e., the fourth host of the second rack, calculates new target storage positions of 8 replicas of data A, and at this time, the fourth host may execute according to the flow in FIG. 3. It can be seen from the flow in FIG. 3 that for the 8 replicas, the new target storage positions may be the same as the original ones, particularly for data replicas whose storage positions in physical topology distance relatively far from the newly added storage devices, the storage positions thereof are rather less possible to change. This means, when the new storage devices are added to the distributed data storage system, a good many of data replicas do not need to migrate, the amount of migrated data is quite small, the effect to the efficiency of the system is relatively small, and therefore, the capacity of the distributed data storage system can be expanded easily.

Figure 4:
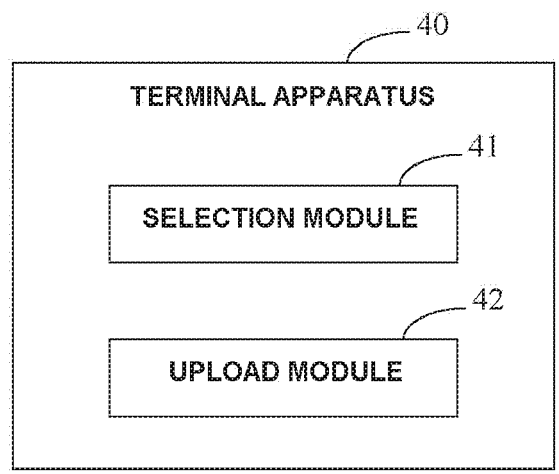
FIG. 4 is a diagram of the basic structure of a terminal apparatus according to the embodiments of the present invention.

The basic structure of a terminal apparatus in the embodiment of the present invention will be described. The terminal apparatus is set in a terminal device such as a PC, and is connected with the distributed data storage system with a tree structure through the Internet. FIG. 4 is a diagram of the basic structure of a terminal apparatus in the embodiments of the present invention. As shown in FIG. 4, a terminal apparatus 40 mainly comprises a selection module 41 and an upload module 42.

The selection module 41 is used for, regarding each data replica of data to be stored, selecting, from a pre-selected intermediate node of a tree structure, child nodes level by level in a preset child node selection mode until a child node selected is a leaf node according to the tree structure of the distributed data storage system, and then determining the leaf node as a target storage position of the data replica; wherein the child node selection mode is taking the combination of an identification of the data to be stored and an identification of a child node as a host image, obtaining a mapping value related to the child node using a preset mapping mode, and selecting a child node of the intermediate node according to a plurality of mapping values of all child nodes related to the same intermediate node; for each intermediate node, resetting the mapping relationship before each selection of child nodes thereof.

The upload module 42 is used for, after the selection module 41 determines target storage positions of all data replicas of the data to be stored, transmitting all the data replicas of the data to be stored and information of the target storage positions of all the data replicas of the data to be stored to a computer in the distributed data storage system such that the computer saves all the data replicas of the data to be stored into the target storage positions thereof, respectively.

The selection module 41 is further used for, regarding specified one or more of the intermediate nodes, if the intermediate node(s) is(are) selected again during the determination of target storage positions of all data replicas of the data to be stored, re-selecting from all brother nodes of the intermediate node(s).

The selection module 41 is further used for, during the determination of target storage positions of all data replicas of the data to be stored, if the target storage position determined for a current data replica is the same as that for another data replica, re-determining the target storage position of the current data replica such that the target storage positions of all the data replicas of the data to be stored are different.

Figure 5:
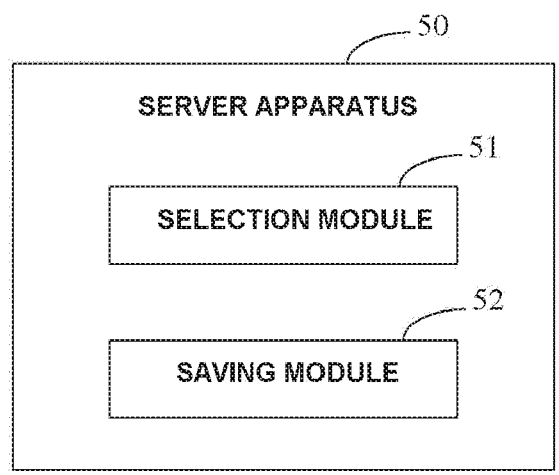
FIG. 5 is a diagram of the basic structure of a server apparatus according to the embodiments of the present invention.

FIG. 5 is a diagram of the basic structure of a server apparatus in the embodiments of the present invention. The server apparatus is set within a server in a distributed data storage system with a tree structure, and used for saving a plurality of data replicas of data to be stored in the distributed data storage system. As shown in FIG. 5, a server apparatus 50 mainly comprises a selection module 51 and a saving module 52, wherein the selection module 51 may adopt a structure similar to that of the selection module 51; the saving module 52 is for saving all data replicas of the data to be stored into target storage positions thereof respectively after the selection module 51 determines the target storage positions of all the data replicas of the data to be stored.

The server apparatus 50 further comprises an acknowledgement module (not shown in the figure) for triggering the selection module 51 in a server where one pre-selected replica of respective data currently saved in the distributed data storage system is located when a node in the distributed data storage system changes. The selection module 51 is further used for, when it is triggered by the acknowledgement module, taking the pre-selected replica and other replicas identical with the replica as the data to be stored, determining a new target storage position of each data replica of the data to be stored, and then migrating data replicas, of which original storage positions are not the new target storage positions, into the new target storage positions.

The basic principle of the present invention is described by combining the Embodiments in the above. However, it needs to point out those skilled in the field should understand that all or any of the steps or parts of the method and the devices in the present invention can be implemented in the form of hardware, firmware, software or the combination thereof in any calculation apparatus, including processors and storage media, or a network of the calculation apparatus. This can be implemented by those skilled in the field using their basic programming skills after reading the explanations of the present invention.

Accordingly, the object of the present invention can also be realized by running one program or a group of programs in any calculation apparatus which can be a commonly known universal apparatus. Thus, the object of the present invention can also be realized by only providing a program product containing program codes that can realize the method or apparatus. That is, such program product also constitutes the present invention, and a storage medium storing the program product constitutes the present invention, too. Obviously, the storage medium may either be any commonly known storage medium or any storage medium to be developed.

It should be pointed out that each part or step in the apparatuses and method in the present invention can be decomposed and/or re-combined apparently. These decompositions and/or re-combinations should be regarded as equivalent solutions of the present invention. Moreover, the steps of executing the aforesaid serial processing may be carried out naturally according to the explanation order and the time order, but do not absolutely need to be carried out according to the time order. Some steps can be executed in parallel or separately.

The aforesaid embodiments do not constitute the restriction to the protection scope of the present invention. Those skilled in the art should understand that depending on the requirement of design and other factors, there may be various modifications, combinations, sub-combinations and replacements. Any modification, equivalent replacement, improvement and the like within the spirit and principle of the present invention should be encompassed within the protection scope of the present invention.

What is claimed is:

1. A method for storing data replicas, applied in a distributed data storage system with a tree structure having a plurality of levels and without a center node, wherein the tree structure comprises a plurality of leaf nodes, on which storage medium devices are located, and a plurality of intermediate nodes, wherein each of the plurality of intermediate nodes has one or more child nodes; and characterized in that the method comprises:

Step A: for each of a plurality of data replicas of data to be stored, selecting a target storage position within the tree structure, wherein selecting the target storage position includes moving level by level through the plurality of levels from a pre-selected intermediate node of the plurality of intermediate nodes included in the tree structure according to the tree structure in a preset child node selecting mode until reaching one of the plurality of leaf nodes, and setting the one of the plurality of leaf nodes as the target storage position of said each data replica;

wherein the preset child node selecting mode includes obtaining a mapping value related to each child node of the pre-selected intermediate node according to a preset mapping mode by combining an identification of the data to be stored and an identification of said each child node of said pre-selected intermediate node;

selecting one child node of said pre-selected intermediate node according to a comparison of the mapping values obtained for each child node of the pre-selected intermediate node;

when the one child node selected of said pre-selected intermediate node is one of the plurality of leaf nodes, setting the one child node selected of said pre-selected intermediate node as the target storage position of said each data replica; and when the one child node selected of said pre-selected intermediate node is not one of the plurality of leaf nodes, resetting the preset mapping mode, setting the pre-selected intermediate node to the one child node, and repeating the preset child node selecting mode; and Step B: after determining the target storage position of each said data replica, saving each said data replica in the target storage position of said each data replica, wherein obtaining the mapping value related to the each child node of the pre-selected intermediate node according to the preset mapping mode comprises calculating a hash value using a Hash algorithm based on the identification of the data to be stored and the identification of said each child node of said pre-selected intermediate node as combined and multiplying the hash value by a preset weighted value; wherein the preset weighted value is the sum of weighted values of all leaf nodes in communication with the each child node of the pre-selected intermediate node, wherein the preset weighted values are in positive correlation with storage capacity of a storage medium device on all the leaf nodes in communication with the each child node of the pre-selected intermediate node.

2. The method of claim 1, characterized in that when the pre-selected intermediate node is set to one of the plurality of intermediate nodes previously set as the pre-selected intermediate node, setting the pre-selected intermediate node to a sibling node of the pre-selected intermediate node.

3. The method of claim 1, characterized in that during the determination of the target storage position for each said data replica re-determining the target storage position of one of the plurality of data replicas according to Step A when the target storage position of the one of the plurality of data replicas is the same as another one of the plurality of data replicas.

4. The method of claim 1, characterized in that obtaining the mapping value related to the each child node of the pre-selected intermediate node according to the preset mapping mode comprises calculating a unique mapping value using a Hash algorithm and the identification of the data to be stored and the identification of said each child node of said pre-selected intermediate node as combined.

5. The method of claim 4, characterized in that obtaining the mapping value related to the each child node of the pre-selected intermediate node according to the preset mapping mode comprises obtaining the mapping value based on the identification of the data to be stored and the identification of said each child node of said pre-selected intermediate node as combined and an adjustable parameter and wherein the step of resetting the preset mapping mode comprises changing the adjustable parameter.

6. A terminal apparatus, used for saving a plurality of data replicas of data to be stored into a distributed data storage system with a tree structure having a plurality of levels and without a center node, wherein the tree structure comprises a plurality of leaf nodes on which storage medium devices are located, and a plurality of intermediate nodes, wherein each of the plurality of intermediate nodes has one or more child nodes; and characterized in that the terminal apparatus comprises:

a storage medium; and at least one processor configured to for each of the plurality of data replicas, select a target storage position within the tree structure, wherein selecting the target storage position includes moving level by level through the plurality of levels from a pre-selected intermediate node of the plurality of intermediate nodes included in the tree structure according to the tree structure in a preset child node selecting mode until reaching one of the plurality of leaf nodes, and setting the one of the plurality of leaf nodes as the target storage position of said each data replica;

wherein the preset child node selecting mode includes obtaining a mapping value related to each child node of the pre-selected intermediate node according to a preset mapping mode by combining an identification of the data to be stored and an identification of said each child node of said pre-selected intermediate node,
  when the one child selected of said pre-selected intermediate node is one of the plurality of leaf nodes, setting the one child node selected of said pre-selected intermediate node as the target storage position of said each data replica; and
  when the one child node selected of said pre-selected intermediate node is not one of the plurality of leaf nodes, resetting the preset mapping mode, setting the pre-selected intermediate node to the one child node, and repeating the preset child node selecting mode; and
after the target storage position of each said data replica is determined, transmit the target storage position of each of the plurality of data replicas to a computer in the distributed data storage system, such that the computer saves each said data replicas in the target storage position of said each data replica,
wherein the processor is configured to obtain the mapping value related to the each child node of the pre-selected intermediate node according to the preset mapping mode by calculating a hash value using a Hash algorithm based on the identification of the data to be stored and the identification of said each child node of said pre-selected intermediate node as combined and multiplying the hash value by a preset weighted value; wherein the preset weighted value is the sum of weighted values of all leaf nodes in communication with the each child node of the pre-selected intermediate node, wherein the preset weighted values are in positive correlation with storage capacity of a storage medium device on all the leaf nodes in communication with the each child node of the pre-selected intermediate node.

7. The terminal apparatus of claim 6, characterized in that the processor is further configured to, when the pre-selected intermediate node is set to one of the plurality of intermediate nodes previously set as the pre-selected intermediate node, set the pre-selected intermediate node to a sibling node of the pre-selected intermediate node.

8. The terminal apparatus of claim 6, characterized in that the processor is further configured to, during the determination of the target storage position of each said data replica, re-determining the target storage position of one of the plurality of data replicas when the target storage position of the one of the plurality of data replicas is the same as another one of the plurality of data replicas.

9. The terminal apparatus of claim 6, characterized in that the processor is configured to obtain the mapping value related to the each child node of the pre-selected intermediate node according to the preset mapping mode by calculating a unique mapping value using a Hash algorithm and the identification of the data to be stored and the identification of said each child node of said pre-selected intermediate node as combined.

10. A server apparatus, provided within a server of a distributed data storage system with a tree structure having a plurality of levels and without a center node; used for storing a plurality of data replicas of data to be stored in the distributed data storage system, the tree structure comprising a plurality of leaf nodes on which storage medium devices are located, and a plurality of intermediate nodes, wherein each of the plurality of intermediate nodes has one or more child nodes; and characterized in that the server apparatus comprises:

a storage medium; and
a processor configured to
for each of the plurality of data replicas, select a target storage position within the tree structure, wherein selecting the target storage position includes
  moving level by level through the plurality of levels from a pre-selected intermediate node of the plurality of intermediate nodes included in the tree structure according to the tree structure in a preset child node selecting mode until reaching one of the plurality of leaf nodes, and
  set the one of the plurality of leaf nodes as the target storage position of said each data replica;
wherein the preset child node selecting mode includes
  obtaining a mapping value related to each child node of the pre-selected intermediate node according to a preset mapping mode by combining an identification of the data to be stored and an identification of said each child node of said pre-selected intermediate node,
  selecting one child node of said pre-selected intermediate node according to a comparison of the mapping values obtained for each child node of the pre-selected intermediate node;
  when the one child node selected of said pre-selected intermediate node is one of the plurality of leaf nodes, setting the one child node selected of said pre-selected intermediate node as the target storage position of said each data replica; and
  when the one child node selected of said pre-selected intermediate node is not one of the plurality of leaf nodes, resetting the preset mapping mode, setting the pre-selected intermediate node to the one child node, and repeated the preset child node selecting mode; and
save each said the data replica in the target storage position of the said each data replica, after the target storage positions of each said data replica is determined,
wherein the processor is configured to obtain the mapping value related to the each child node of the pre-selected intermediate node according to the preset mapping mode by calculating a hash value using a Hash algorithm based on the identification of the data to be stored and the identification of said each child node of said pre-selected intermediate node as combined and multiplying the hash value by a preset weighted value; wherein the preset weighted value is the sum of weighted values of all leaf nodes in communication with the each child node of the pre-selected intermediate node, wherein the preset weighted values are in positive correlation with storage capacity of a storage medium device on all the leaf nodes in communication with the each child node of the pre-selected intermediate node.

11. The server apparatus of claim 10, characterized in that the processor is further configured to, when the pre-selected intermediate node is set to one of the plurality of intermediate nodes previously set as the pre-selected intermediate node, setting the pre-selected intermediate node to a sibling node of the pre-selected intermediate nodes.

12. The server apparatus of claim 10, characterized in that the processor is further configured to, during the determination of the target storage positions of each said data replica, re-determining the target storage position of one of the plurality of data replaces when the target storage position of the one of the plurality of data replicas is the same as another one of the plurality of data replicas.

13. The server apparatus of claim 10, characterized in that the processor is configured to obtain the mapping value related to the each child node of the pre-selected intermediate node according to the preset mapping mode by calculating a unique mapping value using a Hash algorithm and the identification of the data to be stored and the identification of said each child node of said pre-selected intermediate node as combined.

14. The server apparatus of claim 10, characterized in that processor is further configured to, in a case that a node in the distributed data storage system changes, take a pre-selected replica currently saved in the distributed data storage system and other replicas identical with the presented replica currently saved in the distributed data storage system, determine a new target storage position for each of the preselected replicas and the other replicas identical with the preselected replica, and migrate the preselected replica and the other replicas identical with the preselected replica to said each new target storage position, wherein said each new target storage position is different from an old target storage position.

\* \* \* \* \*